United States Patent
Ebersold

[15] 3,643,519
[45] Feb. 22, 1972

[54] TRANSMISSION ASSEMBLY

[72] Inventor: Robert C. Ebersold, Novelty, Ohio
[73] Assignee: The Warner & Swasey Company, Cleveland, Ohio
[22] Filed: Apr. 8, 1970
[21] Appl. No.: 26,675

[52] U.S. Cl. ................................................74/230.17 A
[51] Int. Cl. ......................................................F16h 55/22
[58] Field of Search................74/230.17 A, 230.17 R, 388 R, 74/217

[56] References Cited

UNITED STATES PATENTS

| | | | |
|---|---|---|---|
| 3,151,492 | 10/1964 | Ozinga | 74/230.17 (A) |
| 3,038,352 | 6/1962 | Murphy | 74/388 (R) UX |
| 3,362,241 | 1/1968 | Heyer | 74/230.17 (A) |

Primary Examiner—Leonard H. Gerin
Attorney—Yount and Tarolli

[57] ABSTRACT

An improved transmission assembly includes a pair of variable diameter drive pulleys having effective diameters which can be changed in response to a command signal to vary the speed of rotation of an output member relative to the speed of rotation of an input member. To accomplish this, the command signal effects operation of a reversible servomotor to operate drive assemblies. One of these drive assemblies moves a section of one drive pulley toward another section of the drive pulley to increase the effective diameter of this drive pulley. Operation of the drive assemblies also moves a section of the other drive pulley away from an associated section of the pulley to decrease the effective diameter of this drive pulley. As the sections of the drive pulleys are being moved, a signal generator provides a feedback signal which varies with variations in the effective diameters of the drive pulleys. An error detector interrupts operation of the servomotor when the feedback signal is a predetermined function of the command signal. A belt stretch compensator assembly is provided to increase the effective diameters of both drive pulleys in response to an increase in the effective length of a drivebelt extending between the drive pulleys.

21 Claims, 6 Drawing Figures

INVENTOR
ROBERT C. EBERSOLD

BY Yount and Tarolli
ATTORNEYS

INVENTOR
ROBERT C. EBERSOLD

BY Yount and Tarolli
ATTORNEYS

TRANSMISSION ASSEMBLY

This invention relates to a transmission assembly which is operable to vary the speed of an output member relative to the speed of an input member by varying the effective diameter of at least one pulley of a pair of pulleys.

It is an object of this invention to provide a new and improved transmission assembly for automatically varying the speed of an output member relative to the speed of an input member in response to a command signal by varying the effective diameter of a drive pulley which is operatively connected to one of the members.

Another object of this invention is to provide a new and improved transmission assembly including first and second pulleys operatively connected to input and output members and a drive means operable to vary the effective diameters of the pulleys and wherein a control means operates the drive means to vary the effective diameters of the first and second pulleys in response to a command signal.

Another object of this invention is to provide a new and improved transmission assembly in accordance with the next preceding object wherein the control means includes a servomotor for operating the drive means in response to the command signal to effect relative movement between sections of the pulleys, a signal generator for providing a feedback signal which varies as a function of variations in the relative positions of the sections of the pulleys, and an error detector responsive to the feedback and command signals to interrupt operation of the servomotor when the feedback signal is a predetermined function of the command signal.

Another object of this invention is to provide a new and improved transmission assembly for varying the speed of an output member relative to the speed of an input member including first and second drive pulleys with a drivebelt extending therebetween and a compensator assembly for automatically increasing the effective diameter of at least one of the drive pulleys in response to an increase in the effective length of the drivebelt to thereby maintain the drivebelt taut.

Another object of this invention is to provide a new and improved transmission assembly for varying the speed of an output member relative to the speed of an input member including a first drive pulley having a plurality of sections which are movable relative to each other to vary the effective diameter of the first drive pulley, a second drive pulley having sections which are movable relative to each other to vary the effective diameter of the second drive pulley, a drivebelt operatively interconnecting the drive pulleys, and a pair of drive assemblies each of which is associated with one of the drive pulleys and includes an externally threaded shaft which cooperates with an internally threaded nut and is operable to effect relative movement between the sections of the associated drive pulley and wherein a compensator assembly is operable to apply biasing forces to the internally threaded nuts to effect an increase in the effective diameters of the drive pulleys in response to an increase in the effective length of the drivebelt.

These and other objects and features of the invention will become more apparent upon a consideration of the following description taken in connection with the accompanying drawings wherein:

The present invention provides a new and improved transmission assembly for automatically varying the speed of an output shaft relative to the speed of an input shaft in response to a command signal. The transmission assembly includes variable diameter input and output drive pulleys. Drive assemblies are associated with these drive pulleys and are operable by a control assembly to vary the effective diameters of the drive pulleys. The control assembly includes a servomotor which is operated in response to a command signal to operate the drive assemblies and vary the effective diameters of the drive pulleys. When the effective diameter of the drive pulleys corresponds to a predetermined function of the command signal, an error detector interrupts operation of the servomotor.

Figure 1:
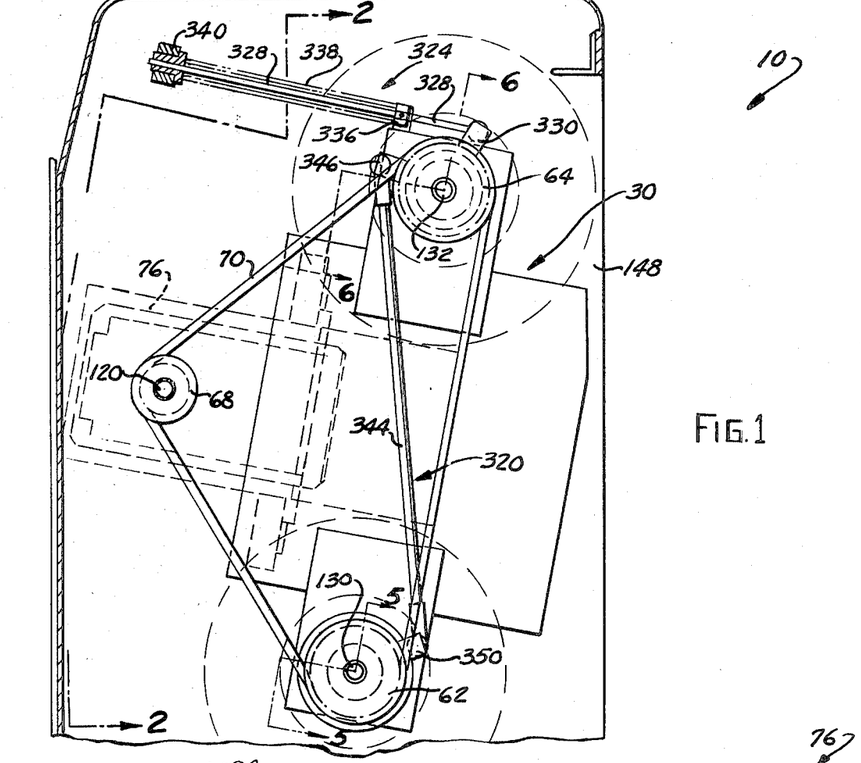
FIG. 1 is a fragmentary elevational view of a transmission assembly constructed in accordance with the present invention.
Figure 2:
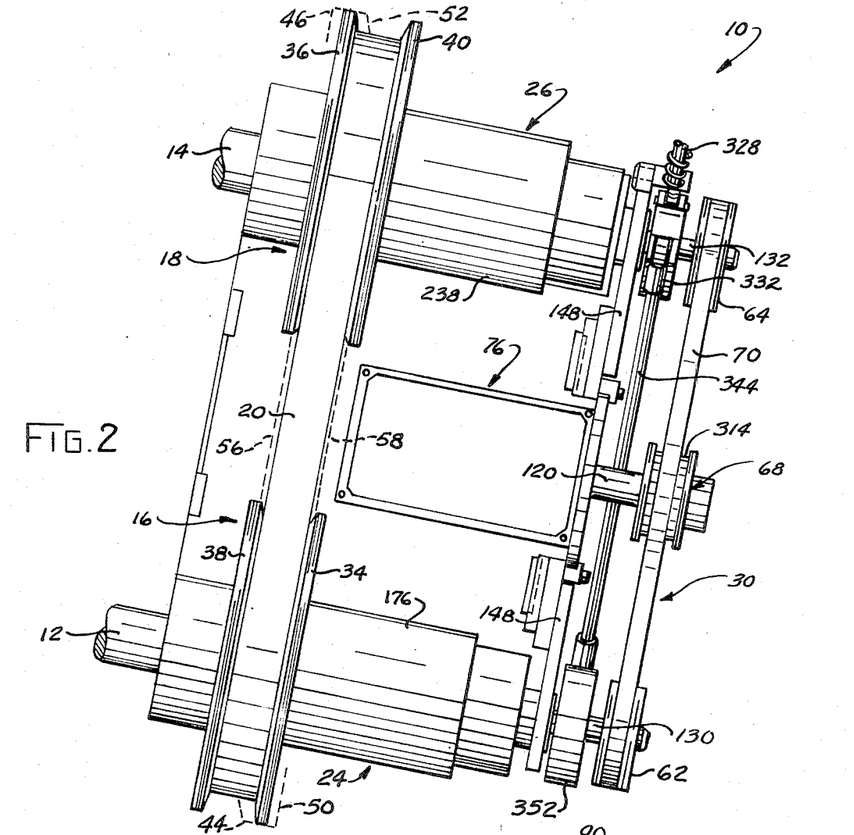
FIG. 2 is a fragmentary view, taken generally along the line 2—2 of FIG. 1, illustrating the relationship between a pair of variable diameter drive pulleys and a control mechanism for operating a pair of drive assemblies to vary the effective diameters of the drive pulleys in response to a command signal.

A specific preferred embodiment of a transmission assembly constructed in accordance with the present invention is illustrated in FIGS. 1 and 2. The transmission assembly 10 is operable to transmit torque from an input shaft 12 to an output shaft 14 by means of a pair of variable diameter drive pulleys 16 and 18 (see FIG. 2). The drive pulleys 16 and 18 are drivingly interconnected by a main drivebelt 20. The speed of the output shaft 14 is varied relative to the speed of the input shaft 12 by operating drive assemblies 24 and 26 which are associated with the drive pulleys 16 and 18, respectively, to vary the effective diameters of the drive pulleys. The drive assemblies 24 and 26 are operated by a control assembly 30 in response to a command signal to vary the speed of rotation of the output shaft 14 relative to the input shaft 12 by an amount which is a predetermined function of the command signal.

To enable the effective diameters of the drive pulleys 16 and 18 to be varied, the drive pulleys include sections 34 and 36 which are movable axially relative to fixed sections 38 and 40 upon operation of the drive assemblies 24 and 26. The effective diameter of the drive pulley 16 is increased by operating the drive assembly 24 to move the section 34 of the drive pulley 16 toward the fixed section 38, i.e., from an intermediate position illustrated in solid lines in FIGS. 2 and 5 to an inner position illustrated in dashed lines at 44. Simultaneously with this operation of the drive assembly 20, the drive assembly 26 is operated to decrease the effective diameter of the drive pulley 18 by moving the section 36 of the drive pulley 18 away from the fixed section 40 of the drive pulley, i.e., from the intermediate position shown in solid lines in FIGS. 2 and 6 to the outer position indicated by dashed lines at 46, to thereby decrease the effective diameter of the drive pulley 18. In this manner an increase in the diameter of the drive pulley 16 is offset by a decrease in the diameter of the drive pulley 18 so that the tension in the drivebelt 20 remains substantially constant. Of course, increasing the effective diameter of the drive pulley 16 and decreasing the effective diameter of the drive pulley 18 results in the speed of rotation of the output shaft 14 being increased relative to the speed of rotation of the input shaft 12.

Figure 5:
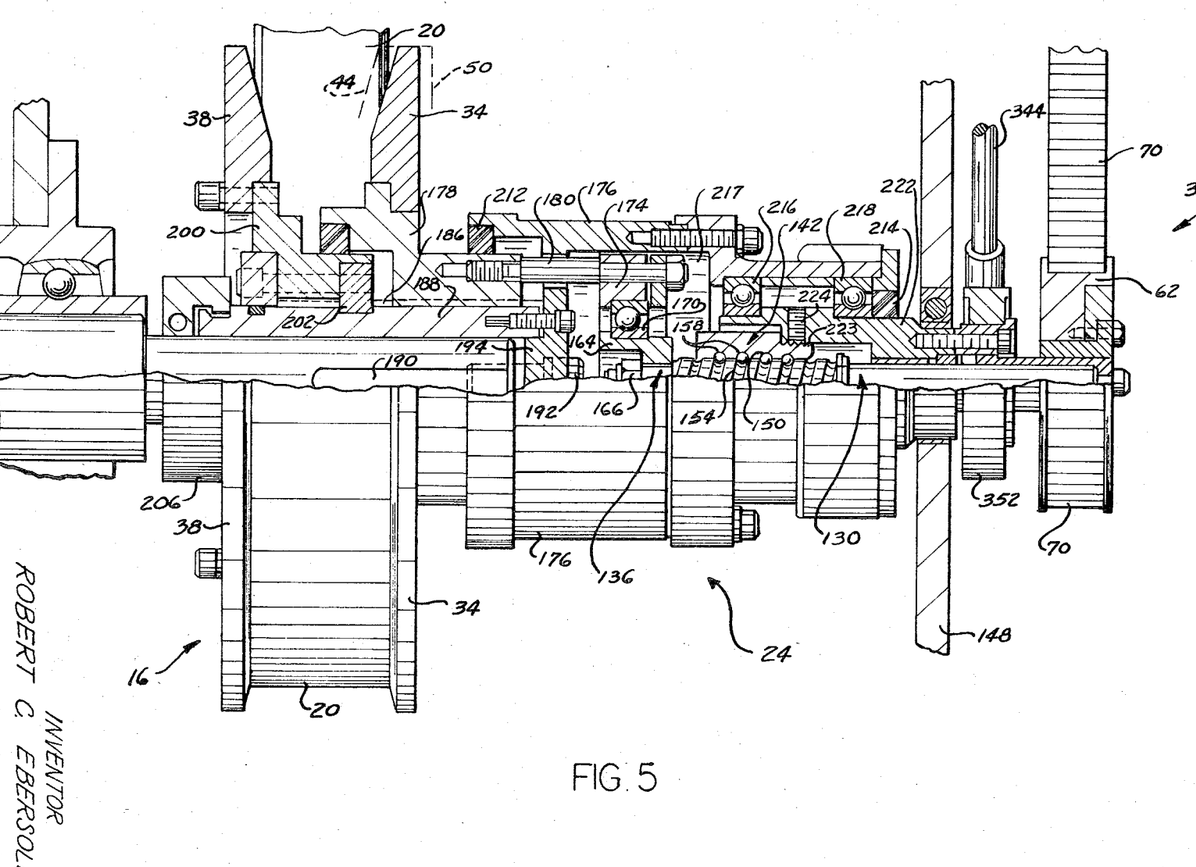
FIG. 5 is an enlarged, partially broken away fragmentary view, taken generally along the line 5—5 of FIG. 1, illustrating the relationship between an output shaft, one of the drive pulleys, and a drive assembly for varying the effective diameter of this drive pulley.

Similarly, the effective diameter of the drive pulley 16 can be decreased by operating the drive assembly 24 to move the section 34 outwardly to a position indicated in dashed lines at 50 in FIGS. 2 and 5. Simultaneously therewith, the drive assembly 26 is operated to move the section 36 of the drive pulley 18 to an inner position, indicated in dashed lines at 52 in FIGS. 2 and 6, to thereby increase the effective diameter of the drive pulley 18. Of course, increasing the effective diameter of the drive pulley 18 while decreasing the effective diameter of the drive pulley 16 slows the speed of rotation of the output shaft 14 relative to the speed of rotation of the input shaft 12.

The extent of movement of the movable sections 34 and 36 relative to the fixed sections 38 and 40 determines the extent to which the effective diameters of the drive pulleys 16 and 18 are varied. Since the drive assemblies 24 and 26 are operated by the control assembly 30 to effect movement of the sections 34 and 36 of the drive pulleys 16 and 18, the extent of movement of the pulley sections is determined by the duration of operation of the control assembly 30. Of course, the greater the change in the effective diameters of the drive pulleys 16 and 18 the greater is the change in the speed of rotation of the output member 14 relative to the speed of rotation of the input member 12.

To prevent skewing or deflecting of the drivebelt 20, the movable sections 34 and 36 of the drive pulleys 16 and 18 are located on opposite sides of the drivebelt 20. When the movable section 34 of the drive pulley 16 is moved inwardly to increase the effective diameter of the drive pulley 16 and the movable section 36 of the drive pulley 18 is moved outwardly to decrease the effective diameter of the drive pulley 18, the drivebelt 20 is shifted axially from the position shown in solid lines in FIG. 2 to the position indicated in dashed lines at 56 in FIG. 2. Since the effective diameter of the drive pulley 16 is increased by an amount which corresponds to the decrease in the effective diameter of the drive pulley 18, the sections 34 and 36 are moved axially through the same distance so that the drivebelt 20 is not skewed or cocked due to the movement of the sections 34 and 36. Similarly, when the effective diameter of the drive pulley 16 is decreased and the effective diameter of the drive pulley 18 increased, the drivebelt 20 is shifted axially to the position indicated in dashed lines at 58 in FIG. 2 to prevent skewing or deflection of the drivebelt.

Upon receipt of a command signal, the control mechanism 30 operates both of the drive assemblies 24 and 26 to simultaneously vary the effective diameters of the drive pulleys 16 and 18 by amounts which are a function of the command signal. The control assembly 30 includes a pair of control pulleys 62 and 64 (FIGS. 1 and 2) which are connected to the drive assemblies 24 and 26, respectively. A main control pulley 68 is drivingly connected with the control pulleys 62 and 64 by a control or timing belt 70. Rotation of the main control pulley 68 drives the timing belt 70 to rotate the control pulleys 62 and 64 and thereby operates the drive assemblies 24 and 26. The timing belt 70 is advantageously of the cog type and meshes with teeth formed on the control pulleys 62, 64 and 68 to provide a positive drive from the main control pulley 68 to the control pulleys 62 and 64.

The main drive pulley 68 is driven by a reversible servomotor 74 (FIG. 3) of a servosystem 76 in response to a command signal from a suitable sensor or other device which provides a command signal when the speed of rotation of the output shaft 14 is to be either increased or decreased relative to the speed of rotation of the input shaft 12. The servosystem 76 is of a type which is well known per se and includes a conductor 80 for transmitting command signals from the sensor to an error detector 82. The error detector 82 is operable to compare the command signal with a feedback signal conducted over a lead 84 from a signal generator 86.

If the speed of the output shaft 14 is to be varied relative to the speed of the input shaft 12, a command signal is transmitted to the error detector 82. Upon receipt of the command signal, the error detector 82 transmits a control or error signal which is amplified and effects energization of the servomotor 74. Energization of the servomotor 74 rotates the main drive pulley 68 through a reduction gear train 90. Rotation of the main control pulley 68 is transmitted by the drivebelt 70 to the control pulleys 62 and 64 to operate the drive assemblies 24 and 26.

If the servomotor 74 is operated in a first or forward direction, the control pulleys 62 and 64 are rotated in a first direction to operate the drive assemblies 24 and 26 to increase the effective diameter of the drive pulley 16 and decrease the effective diameter of the drive pulley 18. Conversely if the servomotor 74 is operated in the reverse direction, the direction of rotation of the control pulley 62 and 64 is reversed to operate the drive assemblies 24 and 26 to decrease the effective diameter of the drive pulley 16 and increase the effective diameter of the drive pulley 18. Thus, depending upon the command signal received by the error detector 82, the servomotor 74 is operable in either of two directions to effect either an increase or a decrease in the speed of rotation of the output shaft 14 relative to the speed of rotation of the input shaft 12.

The signal generator 86, which generates the feedback signal, is also driven by the gear train 90. Therefore, the feedback signal transmitted to the error detector 82 varies with variations in the angular position of the control pulleys 62, 64 and 68. As the angular position of the control pulleys 62, 64 and 68 changes, that is as the control pulleys rotate, the drive assemblies 24 and 26 are driven to vary the effective diameters of the drive pulleys 16 and 18 by an amount which is directly proportional to the extent of angular movement of the control pulleys 62, 64 and 68. Therefore, the feedback signal from the signal generator 86 varies as a function of variations in the effective diameters of the drive pulleys 16 and 18 and as a function of variations in the speed of the output member 14 relative to the speed of the input member 12. The use of the cog-type timing belt 70 for driving the control pulleys 62, 64 and 68 ensures that there is no slippage between the drivebelt and the control pulleys so that the feedback signal from the signal generator 86 properly indicates the extent of rotational movement of the control pulleys 62 and 64 and variations in the effective diameters of the drive pulleys 16 and 18. Although many different types of signal generators 86 can be used, in the illustrated embodiment of the invention the signal generator 86 is a known transformer assembly.

The gear train 90 is of the speed-reducing type so that a relatively large angular movement of a pinion gear 94 which is connected to a drive shaft 96 of the servomotor 74, results in a relatively small angular movement or rotation of the main control pulley 68. Rotational movement of the pinion gear 94 is transmitted to an idler shaft 100 by a gear 102 (see FIGS. 3 and 4) which is in meshing engagement with the pinion gear 94. Rotation of the shaft 100 is in turn transferred by a pinion gear 104 to a relatively large gear 106 and a gear shaft 108. This rotation of the gear shaft 108 is transmitted by a pinion gear 110 to a gear 112 which is fixedly mounted on a shaft 114. Rotation of the shaft 114 rotates a pinion gear 116 and a main drive gear 118 which is fixedly connected to a shaft 120. One end portion of the shaft 120 drives the signal generator 86. The opposite end portion of the shaft 120 is fixedly connected to the main control pulley 68. Therefore, rotation of the shaft 120 drives the signal generator to an extent which corresponds to the extent of angular or rotational movement of the main control pulley 68.

The two drive assemblies 24 and 26 (see FIGS. 5 and 6) are operable upon rotation of the control pulleys 62 and 64 to vary the effective diameters of the drive pulleys 16 and 18. Although the two drive assemblies 24 and 26 differ somewhat from each other, they have many common features. Thus, the drive assemblies 24 and 26 both include externally threaded shafts 130 and 132 which are parallel to each other and are fixedly connected at one end portion to the control pulleys 62 and 64, respectively. Connector assemblies 136 and 138 connect the opposite ends of the shafts 130 and 132 with the movable sections 34 and 36 of the associated drive pulleys 16 and 18. The connector assemblies 136 and 138 enable the shafts 130 and 132 to rotate relative to the movable pulley sections 34 and 36 while retaining the shafts 130 and 132 against axial movement relative to the associated pulley sections.

Internally threaded nuts 142 and 144 (FIGS. 5 and 6) cooperate with the externally threaded shafts 130 and 132, respectively, and are retained against axial movement by a frame assembly 148. Internal thread convolutions 150 and 152 on the nuts 142 and 144 are connected with external thread convolutions 154 and 156 on the shafts 130 and 132 in a known manner by suitable balls or bearings 158. The thread convolutions 150 through 156 have the same pitch and direction of slope. Therefore, upon rotation of the control pulleys 62 and 64 by the timing belt 70, the shafts 130 and 132 are rotated in the same direction (see FIG. 1) and the interaction between the external thread convolutions 154 and 156, the balls 158 and the internal thread convolutions 150 and 152 results in the shafts being moved axially relative to the nuts 142 and 144 and the frame 148 for equal distances in the same direction. This axial motion of the shafts 130 and 132 is transmitted by the connector assemblies 136 and 138 to the movable sections 34 and 36 of the drive pulleys 16 and 18 to effect substantially equal variations in the effective diameters of the drive pulleys.

If the effective diameter of the drive pulley 16 is to be increased and the effective diameter of the drive pulley 18 decreased, the main control pulley 68 is rotated in a clockwise direction as viewed in FIG. 1 by operation of the servomotor 74. The two control pulleys 62 and 64 and associated shafts 130 and 132 are also rotated in a clockwise direction as viewed in FIG. 1. This rotation of the shafts 130 and 132 relative to the nuts 142 and 144 causes the shafts and the control pulleys 62 and 64 to be moved axially toward the left as viewed in FIGS. 5 and 6. The leftward movement of the shafts 130 and 132 (as viewed in FIGS. 5 and 6) causes the movable section 34 of the drive pulley 16 to move toward the associated fixed section 38 to thereby increase the effective diameter of the drive pulley 16. Similarly, the leftward movement of the shaft 132 moves the movable section 36 of the drive pulley 18 away from the associated fixed pulley section 40 to thereby decrease the effective diameter of the drive pulley 18. Since the movable pulley sections 34 and 36 are both moved for substantially the same distance toward the left (as viewed in FIGS. 5 and 6), the drivebelt 20 is shifted toward the position indicated in dashed lines at 56 in FIG. 2 without skewing or cocking of the drivebelt.

Conversely, when the main control pulley 68 is rotated in a counterclockwise direction (as viewed in FIG. 1) by operation of the servomotor 74, the control pulleys 62 and 64 and shafts 130 and 132 are rotated in a counterclockwise direction. This counterclockwise rotation of the shafts 130 and 132 results in an interaction with the nuts 142 and 144 to move the shafts toward the right as viewed in FIGS. 5 and 6 Therefore, the movable section 34 of the drive pulley 16 is moved away from the associated fixed section 38 of the drive pulley 16 to thereby decrease its effective diameter. Similarly, the movable section 36 of the drive pulley 18 is moved toward the associated fixed section 40 to thereby increase the effective diameter of the drive pulley 18.

Although the drive assemblies 24 and 26 are similar in many respects, they differ somewhat in the precise manner in which the shafts 130 and 132 and movable pulley sections 34 and 36 are interconnected. The connector assembly 136 (FIG. 5) for operatively connecting the shaft 130 to the movable section 34 of the drive pulley 16 includes an inner annular member 164 which is fixedly connected by a suitable nut and key arrangement 166 to one end of the shaft 130. A bearing assembly 170 enables the inner annular member 164 to rotate relative to an outer annular member 174 which is splined or keyed to a casing or housing 176 for axial movement relative thereto. Upon axial movement of the shaft 130 and inner annular member 164, the bearing assembly 170 moves the outer annular member 174 axially relative to the housing 176 and fixed pulley section 38.

The movable pulley section 34 is fixedly mounted on a slide block 178 which is in turn connected by a bolt 180 to the outer annular member 174. Therefore, upon axial movement of the outer annular member 174 with the shaft 130, the slide block 178 is moved in the same direction to move the movable section 34 of the drive pulley 16 relative to the fixed section 38 of the drive pulley. This axial movement of the slide block 178 is guided by a spline or key 186 formed on a sleeve 188 which is fixedly connected to the input shaft 12. The sleeve 188 is retained against rotation relative to the input shaft 12 by a suitable key arrangement 190 and is retained against axial movement relative to the input shaft 12 by a bolt 192 which secures an end plate 194 to the input shaft 12. It should be noted that the end plate 194 is integrally formed with the housing 176 so that the housing rotates with the drive pulley 16.

The fixed pulley section 38 is secured to the sleeve 188 by an annular support block 200. The annular support block 200 is bolted to a connector ring 202 which extends into a recess in the sleeve 188 to retain the support block 200 against axial movement relative to the sleeve. A clamp assembly 206 engages the input shaft 12 and sleeve 188 to further retain the sleeve against axial movement relative to the input shaft 12. Since both sections of the drive pulley 16 are secured against rotation relative to the sleeve 188, they are rotated therewith upon rotation of the input shaft 12.

The housing 176 encloses the nut 142 and the threaded portion 154 of the shaft 130. To facilitate relative movement between the threaded shaft 130 and nut 142, the housing 176 is at least partially filled with oil or other lubricating fluid. This lubricating fluid is retained by seals 212 and 214 in a cavity 217 defined by the housing 176. Rotation of the housing 176 relative to the nut is facilitated by a pair of bearing assemblies 216 and 218 which are disposed between the housing 176 and a support member 222. The bearing assemblies 216 and 218 retain the housing 176 against axial movement relative to the support member 222. The support member 222 is rotatably supported by the frame 148 while being retained against axial movement relative to the frame. A threaded end portion 223 of the nut 142 engages internal threads on the support member 222 and is held against rotation relative thereto by a setscrew 224. It should be noted that the nut 142 and support member 222 can be rotated together relative to the frame assembly 148. However, they are held against axial movement relative to the frame assembly 148.

The connector assembly 138 (FIG. 6) for operatively connecting the shaft 132 to the movable section 36 of the drive pulley 18 includes an inner annular member 230 which is fixedly connected by a suitable nut and key arrangement 232 to one end of the shaft 132. A bearing assembly 234 enables the inner annular member 230 to rotate relative to an outer annular member 236 which is splined or keyed to a casing or housing 238 for axial movement relative thereto. Accordingly, upon axial movement of the shaft 132 and inner annular member 230, the bearing assembly 234 moves the outer annular member 236 axially relative to the housing 238 and fixed pulley section 40.

Figure 6:
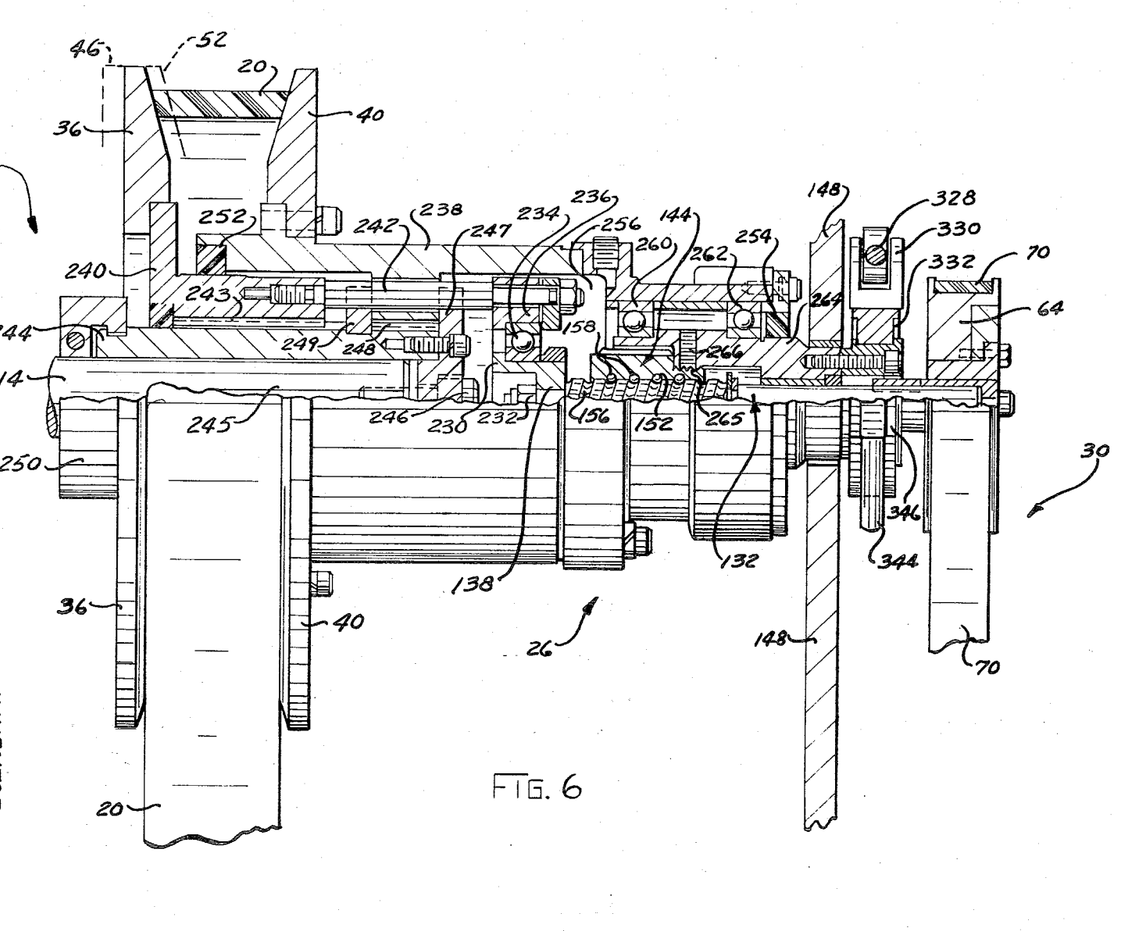
FIG. 6 is an enlarged, partially broken away fragmentary view, taken generally along the line 6—6 of FIG. 1, illustrating the relationship between an output shaft, one of the drive pulleys, and a drive assembly for varying the effective diameter of this drive pulley.

The movable pulley section 36 is fixedly mounted on a slide block 240 which is in turn connected by a bolt 242 to the outer annular member 236. Therefore, upon axial movement of the outer annular member 236 with the shaft 132, the slide block 240 is moved in the same direction to move the movable section 36 of the drive pulley 18 relative to the fixed section 40 of the drive pulley. This axial movement of the slide block 240 is guided by a spline or key 243 formed on a sleeve 244 which is fixedly connected to the output shaft 14. The sleeve 244 is retained against rotation relative to the output shaft 14 by a suitable key arrangement 245 and is retained against axial movement relative to the output shaft 14 by a bolt 246 which secures an end plate 247 to the output shaft 14.

The fixed pulley section 40 is fixedly secured to the housing 238 which is keyed or splined at 248 to the sleeve 244. The housing 238 is retained against axial movement relative to the sleeve 244 by a connector ring 249. A clamp assembly 250 engages the output shaft 14 and sleeve 244 to further retain the sleeve against axial movement relative to the output shaft 14. Since both sections of the drive pulley 18 are secured against rotation relative to the sleeve 244, they are rotated therewith upon rotation of the output shaft 14.

The housing 238 encloses the nut 144 and the threaded portion 156 of the shaft 132. To facilitate relative movement between the threaded shaft 132 and nut 144, the housing 238 is at least partially filled with oil or other lubricating fluid. This lubricating fluid is retained by seals 252 and 254 in a cavity 256 defined by the housing 238. Rotation of the housing 238 relative to the nut is facilitated by a pair of bearing assemblies 260 and 262 which are disposed between the housing 238 and a support member 264. The bearing assemblies 260 and 262 retain the housing 238 against axial movement relative to the support member 264. The support member 264 is rotatably supported by the frame 148 while being retained against axial movement relative to the frame. A threaded end portion 265 of the nut 144 engages internal threads on the support member 264 and is held against rotation relative thereto by a setscrew 266. It should be noted that the nut 144 and support member 264 can be rotated together relative to the frame assembly 148. However, they are held against axial movement relative to the frame assembly 148.

Figure 3:
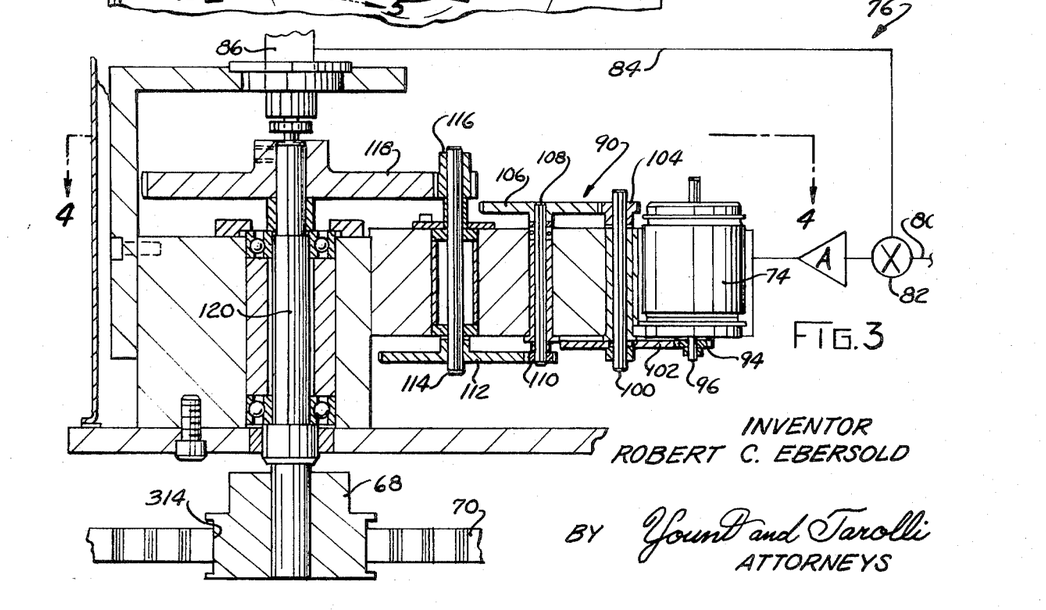
FIG. 3 is a schematicized fragmentary sectional view, taken generally along the line 3—3 of FIG. 4, illustrating a servomotor control assembly for operating the drive assemblies of FIG. 2 to vary the effective diameters of the drive pulleys.
Figure 4:
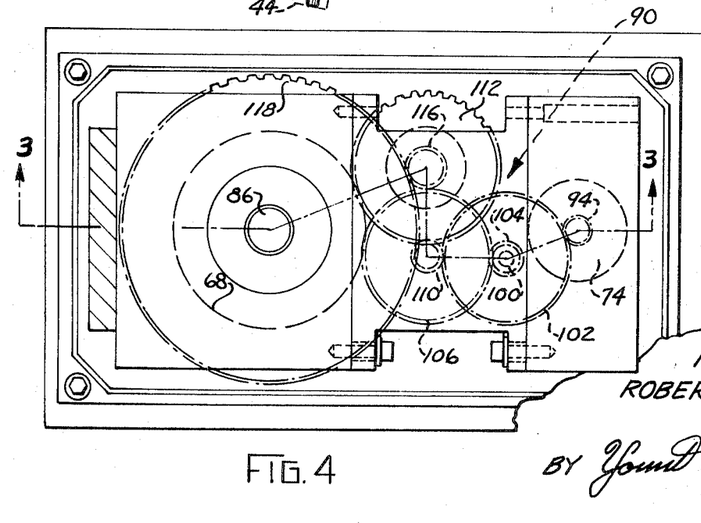
FIG. 4 is a plan view, taken generally along the line 4—4 of FIG. 3, illustrating a gear train for drivingly connecting the servomotor and control assembly of FIG. 3 with a main control pulley.

When the servomotor 74 is energized to drive the main control pulley 68, the control pulleys 62 and 64 are associated shafts 130 and 132 are rotated and move axially relative to the frame 148 by the interaction between the shafts 130 and 132 and the nuts 142 and 144. To prevent skewing or deflection of the timing belt 70, the timing belt is moved axially relative to the main control pulley 68 which is held against axial movement relative to the frame 148 by the shaft 120 (FIG. 3). To enable the timing belt 70 to be moved relative to the main control pulley 68, the main control pulley has a toothed drive surface 314 which is generally cylindrical in configuration and has an axial extent which is greater than the width of the timing belt 70 (see FIG. 2). Therefore, when the control pulleys 62 and 64 are moved axially relative to the frame 148 with the shafts 130 and 132, the timing belt 70 is slid axially along the driving surface 314 to prevent the belt from being skewed or deflected. It should be noted that the timing belt 70 is of the cog type and has sections or teeth which interact with the teeth on the driving surface 314 of the main control pulley 68 so that the driving relationship is maintained between the main control pulley 68 and timing belt 70 during this axial movement of the timing belt and without relative rotation between the main control pulley and the timing belt.

During operation of the transmission assembly 10, the main drive belt 20 tends to stretch or otherwise increase in length. Stretching of the main drivebelt 20 reduces the tension in the drivebelt and the pressure exerted by the drivebelt against the drive pulleys 16 and 18. As the drivebelt 20 slackens due to a stretching of the drivebelt, there is an increasing tendency for the drivebelt 20 to slip relative to the pulleys 16 and 18. Of course, this will substantially impair the ability of the drivebelt 20 to transmit forces from the input member 12 to the output member 14. Therefore, a belt stretch compensator or antibacklash assembly 320 (FIG. 1) is provided to take up any slack resulting from a stretching or other increase in the effective length of the main drivebelt 20.

The compensator assembly 320 urges both of the movable pulley sections 34 and 36 toward the associated fixed pulley sections 38 and 40 to thereby increase the effective diameters of the pulleys 16 and 18 in response to an increase in the effective length of the main drivebelt 20. This increase in the effective diameters of the pulleys 16 and 18 takes up any slack in the drivebelt 20 to maintain the drivebelt taut. The compensator assembly 320 includes a biasing spring assembly 324 (FIG. 1) which applies a constant biasing force to the nuts 142 and 144 to tend to rotate them relative to the shafts 130 and 132 (FIGS. 5 and 6). This biasing force tends to rotate the nut 142 in a clockwise direction, viewed from the right-hand end of the shaft 130, and to rotate the nut 144 in a counterclockwise direction, as viewed from the right-hand end of the shaft 132.

When the drivebelt 20 is extending tautly between the pulleys 16 and 18, the tension forces in the drivebelt 20 offset the biasing forces applied to the nuts 142 and 144 by the spring assembly 324. However if the tension in the drivebelt 20 is reduced due to an increase in the effective length of the drivebelt, the biasing forces on the nuts 142 and 144 cause them to rotate relative to the shafts 130 and 132. Since the nuts 142 and 144 are held against axial movement relative to the frame 148, rotation of the nuts causes them to move the shaft 130 to the left as viewed in FIG. 5 and to move the shaft 132 toward the right as viewed in FIG. 6. As was previously explained, this movement of the shafts 130 and 132 increases the effective diameters of the drive pulleys 6 and 18. Of course, the increase in the effective diameters of the drive pulleys 16 and 18 takes up the slack resulting from a stretching of the belt 20 to thereby maintain tension in the belt 20 and frictional pressure of the belt against the pulleys 16 and 18.

The biasing spring assembly 324 includes a connector rod 328 which is pivotally connected to an outwardly projecting arm 330 on a connector ring 332 (See FIG. 6) which is secured to the support member 264 for the nut 144. The connector rod 328 extends through and is slidable relative to a support block 336. A biasing spring 338 extends between the support block 336 and in an adjustable nut assembly 340 which is connected to the outer end of the connector rod 328. The biasing spring 338 exerts a leftward (as viewed in FIG. 1) force on the nut assembly 340 to tend to rotate the arm 330 and connector member 332 in a generally counterclockwise direction as viewed in FIG. 1. This biasing force tends to rotate the nut 144 relative to the shaft 132 in a direction to cause the shaft to be moved toward the right as viewed in FIG. 6. Of course, this rightward movement of the shaft 132 moves the section 36 of the drive pulley 18 toward the fixed section 40 of the drive pulley to increase the effective diameter of the pulley.

The nut 142 must be biased in the opposite direction from the nut 144 to tend to urge the movable section 34 of the drive pulley 16 toward the fixed section 38 in order to increase the effective diameter of the drive pulley. To accomplish this, a connector link 344 is connected at one end to a second arm 346 which extends outwardly toward the left (as viewed in FIG. 1) from the connector member 332. The other end of the link 344 is pivotally connected to an arm 350 which extends outwardly toward the right (as viewed in FIG. 1) from a connector member 352 (FIG. 5). Therefore, the link 344 transmits biasing forces in a generally downward direction to the connector member 352 to thereby tend to rotate the nut 142 in a direction opposite from that which the biasing spring assembly 324 tends to rotate the nut 144.

The single biasing spring 338 is operable to apply a biasing force to both of the nuts 142 and 144. This biasing force tends to rotate the nuts 142 and 144 to effect an increase in the effective diameters of the pulleys 16 and 18 in response to an increase in the effective length of the drivebelt 20. In this manner, the belt stretch compensator assembly 320 tends to maintain the tension in the drivebelt 20 substantially constant even though the drivebelt may stretch during operation of the transmission assembly 10. Of course, when the effective diameters of the pulleys 16 and 18 are increased, the speed of rotation of the output member 14 relative to the speed of rotation of the input member 12 will tend to change. Therefore, the sensor associated with the lead 80 and error detector 82 will provide a suitable command signal to operate the drive assemblies 24 and 26 to provide the desired drive ratio between the input member 12 and output member 14 in the manner previously explained.

In view of the foregoing remarks, it can be seen that the transmission assembly 10 includes a pair of variable diameter drive pulleys whose effective diameters can automatically be changed to vary the speed of rotation of an output member 14 relative to the speed of rotation of an input member 12 in response to a command signal. The command signal, conducted over the lead 80 to the error detector 82, effects operation of a reversible servomotor 74 to operate a pair of drive assemblies 24 and 26 each of which is associated with one of the drive pulleys 16 and 18. Operation of the drive assemblies 24 and 26 moves the sections of one of the drive pulleys 16 or 18 together to increase the effective diameter of this drive pulley and moves sections of the other drive pulley apart to decrease its effective diameter. A signal generator 86 provides a feedback signal which varies with variations in the effective diameters of the drive pulleys 16 and 18. The error detector 82 is operable to effectively compare the feedback signals and command signals and interrupts operation of the servomotor 74 when the effective diameters of the drive pulleys 16 and 18 correspond to a predetermined function of the command signal.

The compensator assembly 320 maintains the drivebelt 20 taut by compensating for increases in the effective length of the drivebelt due to stretching or other causes during operation of the transmission assembly 10. The compensator assembly 320 accomplishes this by increasing the effective diameters of drive pulleys 16 and 18 in response to an increase in the effective length of the drivebelt 20. By increasing the effective diameters of both of the drive pulleys 16 and 18, any slack in the drivebelt 20 is taken up to thereby maintain tension in the drivebelt 20 to prevent slipping of the drivebelt relative to the pulleys. When this occurs, the servosystem 76 is operable in response to a command signal to maintain the desired drive ratio between the input shaft 12 and output shaft 14.

Having described a specific, preferred embodiment of the invention, the following is claimed:

1. A transmission assembly for automatically varying the speed of an output member relative to the speed of an input member in response to a command signal, said transmission assembly comprising a first drive pulley operatively connected to one of the members and having a plurality of sections which are movable relative to each other to vary the effective diameter of said first drive pulley, a second drive pulley operatively connected to the other of the members, said second drive pulley including a plurality of sections which are movable relative to each other, drivebelt means for operatively interconnecting said first and second drive pulleys and for transmitting forces therebetween, drive means for effecting relative movement between said sections of said first drive pulley to vary the effective diameter of said first drive pulley and to thereby vary the speed of said output member relative to the speed of said input member, said drive means being operable to effect relative movement between the sections of said second drive pulley simultaneously with the aforesaid movement between the sections of said first drive pulley, and control means for operating said drive means to vary the effective diameter of said first drive pulley as a function of the command signal, said control means including motor means for operating said drive means in response to the command signal to effect relative movement between said sections of said first drive pulley to thereby vary the effective diameter of said first drive pulley, signal generator means for providing a feedback signal which varies as a function of variations in the relative positions of said sections of said first drive pulley, means responsive to said feedback and command signals for interrupting operation of said motor means when the feedback signal is a predetermined function of the command signal, a first control pulley mounted in a fixed relationship with its axis of rotation and operatively connected to said motor means, a second control pulley mounted for movement along its axis of rotation upon relative movement between said sections of said first drive pulley, a third control pulley mounted for movement along its axis of rotation upon relative movement between said sections of said second drive pulley, and a control drivebelt extending around said control pulleys to drivingly interconnect said control pulleys, said first control pulley having a drive surface for engaging said control drivebelt, said drive surface of said first control pulley having an axial extent which is greater than the width of said control drivebelt to enable said control drivebelt to move axially relative to said first control pulley upon movement of said first and second control pulleys along their axes of rotation to thereby tend to minimize deflection of said control drivebelt.

2. A transmission assembly as set forth in claim 1, further including compensator means for automatically effecting relative movement between said sections of said first and second drive pulleys to increase the effective diameters of said first and second drive pulleys in response to an increase in the effective length of said drivebelt means.

3. A transmission assembly for automatically varying the speed of an output member relative to the speed of an input member in response to a command signal, said transmission assembly comprising a first drive pulley operatively connected to one of the members and having a plurality of sections which are movable relative to each other to vary the effective diameter of said first drive pulley, a second drive pulley operatively connected to the other of the members, said second drive pulley including a plurality of sections which are movable relative to each other, drivebelt means for operatively interconnecting said first and second drive pulleys and for transmitting forces therebetween, drive means for effecting relative movement between said sections of said first drive pulley to vary the effective diameter of said first drive pulley and to thereby vary the speed of said output member relative to the speed of said input member, said drive means being operable to effect relative movement between the sections of said second drive pulley simultaneously with the aforesaid movement between the sections of said first drive pulley, and control means for operating said drive means to vary the effective diameter of said first drive pulley as a function of the command signal, said control means including motor means for operating said drive means in response to the command signal to effect relative movement between said sections of said first drive pulley to thereby vary the effective diameter of said first drive pulley, signal generator means for providing a feedback signal which varies as a function of variations in the relative positions of said sections of said first drive pulley, means responsive to said feedback and command signals for interrupting operation of said motor means when the feedback signal is a predetermined function of the command signal, and a first drive assembly operatively connected to said first drive pulley and a second drive assembly operatively connected to said second drive pulley, said first and second drive assemblies each including internally and externally threaded members which are operatively connected to said control means and one of said sections of an associated one of said drive pulleys, said control means being operable to provide relative movement between said threaded members to move said one of said sections of each of said drive pulleys relative to the other section of each of said drive pulleys, said transmission assembly further comprising compensator means for compensating for increases in the effective length of said drivebelt means by applying a biasing force to rotate one of the members of each of said drive assemblies in a direction relative to the associated threaded member to increase the effective diameter of said first and second drive pulleys.

4. A transmission assembly as set forth in claim 3 wherein one of said sections of said first drive pulley is movable axially relative to the other section of said first drive pulley and is disposed on one side of said drivebelt, and one of said sections of said second drive pulley is movable axially relative to the other section of said second drive pulley and is disposed on a side of said drivebelt opposite from said one side.

5. A transmission assembly for varying the speed of an output member relative to the speed of an input member, said transmission assembly comprising a first drive pulley operatively connected to one of the members and having a plurality of sections which are movable relative to each other to vary the effective diameter of said first drive pulley, a second drive pulley operatively connected to the other of the members and including a plurality of sections which are movable relative to each other, a drivebelt extending in tension between said first and second drive pulleys to transmit forces therebetween, drive means for selectively effecting relative movement between said sections of said first drive pulley in a direction toward each other and in a direction away from each other to selectively increase and decrease the effective diameter of said first drive pulley and to thereby vary the speed of said output member relative to the speed of said input member, said drive means being selectively operable to effect relative movement between the sections of said second drive pulley in a direction toward each other and in a direction away from each other to selectively increase and decrease the effective diameter of said second drive pulley while said drive means simultaneously therewith effects the aforesaid movement between the sections of said first drive pulley, and compensator means for automatically effecting relative movement between said sections of said first drive pulley in a direction toward each other in response to an increase in the effective length of said drivebelt and for simultaneously therewith effecting relative movement of said sections of said second drive pulley toward each other in response to an increase in the effective length of said drivebelt to maintain the tension in said drivebelt by simultaneously increasing the effective diameters of both said first and second drive pulleys.

6. A transmission assembly as set forth in claim 5 wherein said compensator means includes spring means operatively connected with said drive means for applying a biasing force through said drive means to at least one of said sections of said first drive pulley to thereby urge said one section toward the other section of said first drive pulley and for applying a biasing force through said drive means to at least one of said sections of said second drive pulley to thereby urge said one section of said second drive pulley toward the other section of said second drive pulley.

7. A transmission assembly as set forth in claim 5 wherein one of said sections of said first drive pulley is movable axially relative to the other section of said first drive pulley and is disposed on one side of said drivebelt, and one of said sections of said second drive pulley is movable axially relative to the other section of said second drive pulley and is disposed on a side of said drivebelt opposite from said one side.

8. A transmission assembly for automatically varying the speed of an output member relative to the speed of an input member in response to an electrical command signal, said transmission assembly comprising a first drive pulley operatively connected to one of the members and having a plurality of sections which are movable relative to each other to vary the effective diameter of said first drive pulley, a second drive pulley operatively connected to the other of the members, drivebelt means for operatively interconnecting said first and second drive pulleys and for transmitting forces therebetween, drive means for effecting relative movement between said sections of said first drive pulley to vary the effective diameter of said first drive pulley and to thereby vary the speed of said output member relative to the speed of said input member, and control means for activating said drive means to vary the effective diameter of said first drive pulley as a function of the electrical command signal, said control means including electric motor means operable between a deenergized condition and an energized condition in which said electric motor means is effective to operate said drive means to vary the effective diameter of said first drive pulley, means for conducting an electrical command signal to said electric motor means to effect operation of said electric motor means from the deenergized condition to the energized condition to vary the effective diameter of said first drive pulley in response to said electrical command signal, said electrical command signal having a characteristic indicative of a predetermined diameter of said first drive pulley, a signal generator means for providing an electrical feedback signal which varies as a function of variations in the relative positions of said sections of said first drive pulley, and means responsive to said feedback and command signals for deenergizing said electric motor means when the electrical feedback signal is a predetermined function of the electrical command signal.

9. A transmission assembly as set forth in claim 8 wherein said control means includes a first control pulley operatively connected to said electric motor means, a second control pulley mounted for rotation about a common axis with said first drive pulley, a third control pulley mounted for rotation about a common axis with said second drive pulley, and a control drivebelt extending around said control pulleys to drivingly interconnect said control pulleys.

10. A transmission assembly as set forth in claim 9 wherein said second drive pulley includes a plurality of sections which are movable relative to each other, said drive means being operable to effect relative movement between the sections of said second drive pulley simultaneously with the aforesaid movement between the sections of said first drive pulley.

11. A transmission assembly for varying the speed of an output member relative to the speed of an input member, said transmission assembly including a first drive pulley operatively connected to said input member for rotation therewith and including a pair of sections mounted for axial movement relative to each other to vary the effective diameter of said first drive pulley, a second drive pulley operatively connected to said output member for rotation therewith and including a pair of sections mounted for axial movement relative to each other to vary the effective diameter of said second drive pulley, a main drivebelt extending around said first and second drive pulleys to thereby interconnect said first and second drive pulleys, first drive means operable in a first direction to move said sections of said first drive pulley toward each other to increase the effective diameter of said first drive pulley and operable in a second direction to move said sections of said first drive pulley away from each other to decrease the effective diameter of said first drive pulley, second drive means operable in a first direction to move said sections of said second drive pulley toward each other to increase the effective diameter of said second drive pulley and operable in a second direction to move said sections of said second drive pulley away from each other to decrease the effective diameter of said second drive pulley, and control means for operating said first and second drive means to vary the effective diameters of said first and second drive pulleys in response to a command signal, said control means including a first control pulley operatively connected to said first drive means, a second control pulley operatively connected to said second drive means, a main control pulley, control belt means extending around said control pulleys to thereby drivingly interconnect said control pulleys, said main control pulley being rotatable in one direction to effect operation of said first drive means in its first direction to increase the effective diameter of said first drive pulley and to simultaneously therewith effect operation of said second drive means in its second direction to decrease the effective diameter of said second drive pulley, said main control pulley being rotatable in another direction opposite to said one direction to effect operation of said first drive means in its second direction to decrease the effective diameter of said first drive pulley and to simultaneously therewith effect operation of said second drive means in its first direction to increase the effective diameter of said second drive pulley, reversible servomotor means operatively connected to said second main control pulley and operable in forward and reverse directions in response to the command signal to effect rotation of said control pulley and operation of said first and second drive means to thereby vary the effective diameters of said first and second drive pulleys in response to variations in the command signal, signal generator means operatively connected to said servomotor means for providing a feedback signal which varies as a function of variations in the effective diameters of said first and second drive pulleys upon operation of said servomotor means, and means for interrupting operation of said servomotor means when the feedback signal is a predetermined function of the command signal.

12. A transmission assembly as set forth in claim 11 wherein said first drive means includes a first externally threaded shaft operatively connected to said first control pulley, connector means for connecting one of said sections of said first drive pulley to said first shaft for axial movement therewith and for enabling said first shaft to be rotated relative to said one section of said first drive pulley, first internally threaded nut means operatively connected to said first shaft for effecting axial movement of said first shaft and said one section of said first drive pulley relative to the other section of said first drive pulley upon rotation of said first shaft to thereby vary the effective diameter of said first drive pulley, said second drive means including a second externally threaded shaft operatively connected to said second control pulley, connector means for connecting one of said sections of said second drive pulley to said second shaft for axial movement therewith and for enabling said second shaft to be rotated relative to said one section of said second drive pulley, second internally threaded nut means operatively connected to said second shaft for effecting axial movement of said second shaft and said one section of said second drive pulley relative to the other section of said second drive pulley upon rotation of said second shaft to thereby vary the effective diameter of said second drive pulley, said one section of said first drive pulley being located on one side of said main drivebelt and said one section of said second drive pulley being located on the opposite side of said main drivebelt, said first and second shafts both being rotatable in a one direction by said first and second control pulleys upon operation of said servomotor means and rotation of said main control pulley in its one direction to operate said first drive means in its first direction and effect axial movement of said one section of said first drive pulley toward said other section of said first drive pulley to thereby increase the effective diameter of said first drive pulley and to simultaneously therewith operate said second drive means in its second direction and effect movement of said one section of said second drive pulley away from said other section of said second drive pulley to thereby decrease the effective diameter of said second drive pulley, said first and second shafts both being rotatable in another direction opposite to said one direction by said first and second control pulleys upon operation of said servomotor means and rotation of said main control pulley in its other direction to operate said first drive means in its second direction and effect axial movement of said one section of said first drive pulley away from said other section of said first drive pulley to thereby decrease the effective diameter of said first drive pulley and to simultaneously therewith operate said second drive means in its first direction and effect movement of said one section of said second drive pulley toward said other section of said second drive pulley to thereby increase the effective diameter of said second drive pulley.

13. A transmission assembly as set forth in claim 12 further including compensator means for applying biasing forces to said first nut means in a direction to effect movement of said one section of said first drive pulley toward said other section of said first drive pulley and for simultaneously therewith applying biasing forces to said second nut means in a direction to effect movement of said one section of said second drive pulley toward said other section of said second drive pulley to thereby increase the effective diameters of said first and second drive pulleys in response to an increase in the effective length of said main drivebelt.

14. A transmission assembly as set forth in claim 12 wherein said first and second nut means cooperate with said first and second shafts to move said first and second shafts and said first and second control pulleys in the same axial direction upon operation of said servomotor means and rotation of said main control pulley, said main control pulley having a generally cylindrical drive surface means for drivingly engaging said control belt means, said drive surface means having an axial extent which is greater than the width of said control belt means to enable said control belt means to be shifted axially relative to said main control pulley upon axial movement of said first and second control pulleys.

15. A transmission assembly for varying the speed of an output member relative to the speed of an input member, said transmission assembly comprising a first drive pulley having a plurality of sections which are movable relative to each other to vary the effective diameter of said first drive pulley, a second drive pulley having a plurality of sections which are movable relative to each other to vary the effective diameter of said second drive pulley, a drivebelt operatively interconnecting said first and second drive pulleys to transmit forces therebetween, drive means for effecting relative movement between said sections of said first and second drive pulleys to vary the effective diameters of said first and second drive pulleys and to thereby vary the speed of said output member relative to the speed of said input member, and control means for operating said drive means to vary the effective diameters of said drive pulleys, said drive means including a first drive assembly operatively connected to said first drive pulley and a second drive assembly operatively connected to said second drive pulley, said first and second drive assemblies each including internally and externally threaded members which are operatively connected to said control means and at least one of said sections of an associated one of said drive pulleys, said control means being operable in a first direction to provide relative rotation between said threaded members to move said one of said sections of each of said drive pulleys relative the other section of each of said drive pulleys to increase the effective diameter of said first drive pulley and to simultaneously therewith decrease the effective diameter of said second drive pulley, said control means being operable in a second direction to provide relative rotation between said threaded members to move said one of said sections of each of said drive pulleys relative to the other section of each of said drive pulleys to decrease the effective diameter of said first drive pulley and to simultaneously therewith increase the effective diameter of said second drive pulley, and compensator means for applying a biasing force tending to rotate one of the threaded members of each of said drive assemblies in such a direction relative to the associated threaded member as to simultaneously increase the effective diameters of both of said drive pulleys to thereby take up any slack which may result from an increase in the effective length of said drivebelt.

16. A transmission assembly as set forth in claim 15 wherein said control means includes means responsive to a change in the speed of the output member upon an increase in the effective diameters of said first and second drive pulleys for offsetting the change in speed of the output member by operating said drive means to vary the effective diameters of said drive pulleys.

17. A transmission assembly as set forth in claim 6 wherein said means responsive to the change in speed of the output member includes motor means for operating said drive means in response to a command signal indicative of a change in speed of the output member relative to a predetermined speed to thereby effect relative movement between said sections of said drive pulleys, signal generator means for providing a feedback signal which varies as a function of variations in the relative positions of said sections of said drive pulleys, and means responsive to said feedback and command signals for interrupting operation of said motor means when said feedback signal is a predetermined function of said command signal.

18. A transmission assembly for varying the speed of an output member relative to the speed of an input member, said transmission assembly including a first drive pulley operatively connected to said input member for rotation therewith and including a pair of sections mounted for axial movement relative to each other to vary the effective diameter of said first drive pulley, a second drive pulley operatively connected to said output member for rotation therewith and including a pair of sections mounted for axial movement relative to each other to vary the effective diameter of said second drive pulley, a main drivebelt extending around said first and second drive pulleys to thereby interconnect said first and second drive pulleys, first drive means operable in a first direction to move said sections of said first drive pulley toward each other to increase the effective diameter of said first drive pulley and operable in a second direction to move said sections of said first drive pulley away from each other to decrease the effective diameter of said first drive pulley, said first drive means including a first externally threaded shaft, connector means for connecting one of said sections of said first drive pulley to said first shaft for axial movement therewith and for enabling said first shaft to be rotated relative to said one section of said first drive pulley, first internally threaded nut means operatively connected to said first shaft for effecting axial movement of said first shaft and said one section of said first drive pulley relative to the other section of said first drive pulley upon rotation of said first shaft to thereby vary the effective diameter of said first drive pulley, second drive means operable in a first direction to move said sections of said second drive pulley toward each other to increase the effective diameter of said second drive pulley and operable in a second direction to move said sections of said second drive pulley away from each other to decrease the effective diameter of said second drive pulley, said second drive means including a second externally threaded shaft, connector means for connecting one of said sections of said second drive pulley to said second shaft for axial movement therewith and for enabling said second shaft to be rotated relative to said one section of said second drive pulley, second internally threaded nut means operatively connected to said second shaft for effecting axial movement of said second shaft and said one section of said second drive pulley relative to the other section of said second drive pulley upon rotation of said second shaft to thereby vary the effective diameter of said second drive pulley, said one section of said first drive pulley being located on one side of said main drivebelt and said one section of said second drive pulley being located on the opposite side of said main drivebelt whereby relative movement between said sections of said first and second drive pulleys upon operation of said first and second drive means tends to shift said main drivebelt axially with a minimum of deflection of said main drivebelt, and control means for operating said first and second drive means to vary the effective diameters of said first and second drive pulleys, said control means including a first control pulley connected to said first externally threaded shaft, a second control pulley connected to said second externally threaded shaft, a main control pulley, control belt means extending around said control pulleys to thereby drivingly interconnect said control pulleys, said main control pulley being rotatable in a first direction to effect operation of said first drive means in its first direction by rotating said first externally threaded shaft in one direction relative to said first internally threaded nut means to increase the effective diameter of said first drive pulley by moving said one section of said first drive pulley toward said other section of said first drive pulley and to simultaneously therewith effect operation of said second drive means in its second direction by rotating said second externally threaded shaft in said one direction relative to said second internally threaded nut means to decrease the effective diameter of said second drive pulley by moving said one section of said second drive pulley away from said other section of said second drive pulley, said main control pulley being rotatable in a second direction opposite to said first direction to effect operation of said first drive means in its second direction by rotating said first externally threaded shaft in another direction relative to said first internally threaded nut means to decrease the effective diameter of said first drive pulley by moving said one section of said first drive pulley away from said other section of said first drive pulley and to simultaneously therewith effect operation of said second drive means in its first direction by rotating said second externally threaded shaft in said other direction relative to said second internally threaded nut means to increase the effective diameter of said second drive pulley by moving said one section of said second drive pulley toward said other section of said second drive pulley, and compensator means operatively connected to said first and second internally threaded nut means for applying biasing forces thereto to effect relative rotation between said threaded nut means and said shafts to move said shafts in a direction to increase the effective diameters of first and second drive pulleys in response to the occurrence of slack in said main drivebelt to thereby take up the slack.

19. A transmission assembly as set forth in claim 18 wherein said compensator means includes spring means operatively connected to said first and second internally threaded nut means for applying biasing forces thereto urging said first and second externally threaded nut means into tight engagement with said first and second shafts.

20. A transmission assembly as set forth in claim 18 wherein said main control pulley has a generally cylindrical drive surface means for drivingly engaging said control belt means, said drive surface means having an axial extent which is greater than the width of said control belt means to enable said control belt means to be shifted axially relative to said main control pulley upon axial movement of said first and second control pulleys.

21. A transmission assembly as set forth in claim 18 wherein said control means further includes motor means for rotating said main control pulley in response to a command signal to thereby effect rotation of said first and second control pulleys and operation of said first and second drive means to vary the effective diameters of said first and second drive pulleys, signal generator means for providing a feedback signal which varies as a function of variations in the relative positions of said sections of said first and second drive pulleys, and means for interrupting operation of said motor means when the feedback signal is a predetermined function of the command signal.

* * * * *